Jan. 15, 1952     F. TOOP     2,582,804
DUAL VALVE SELECTIVE CONTROL HANDLE
ASSEMBLY FOR COMBINATION FAUCETS
Filed May 9, 1947     2 SHEETS—SHEET 1
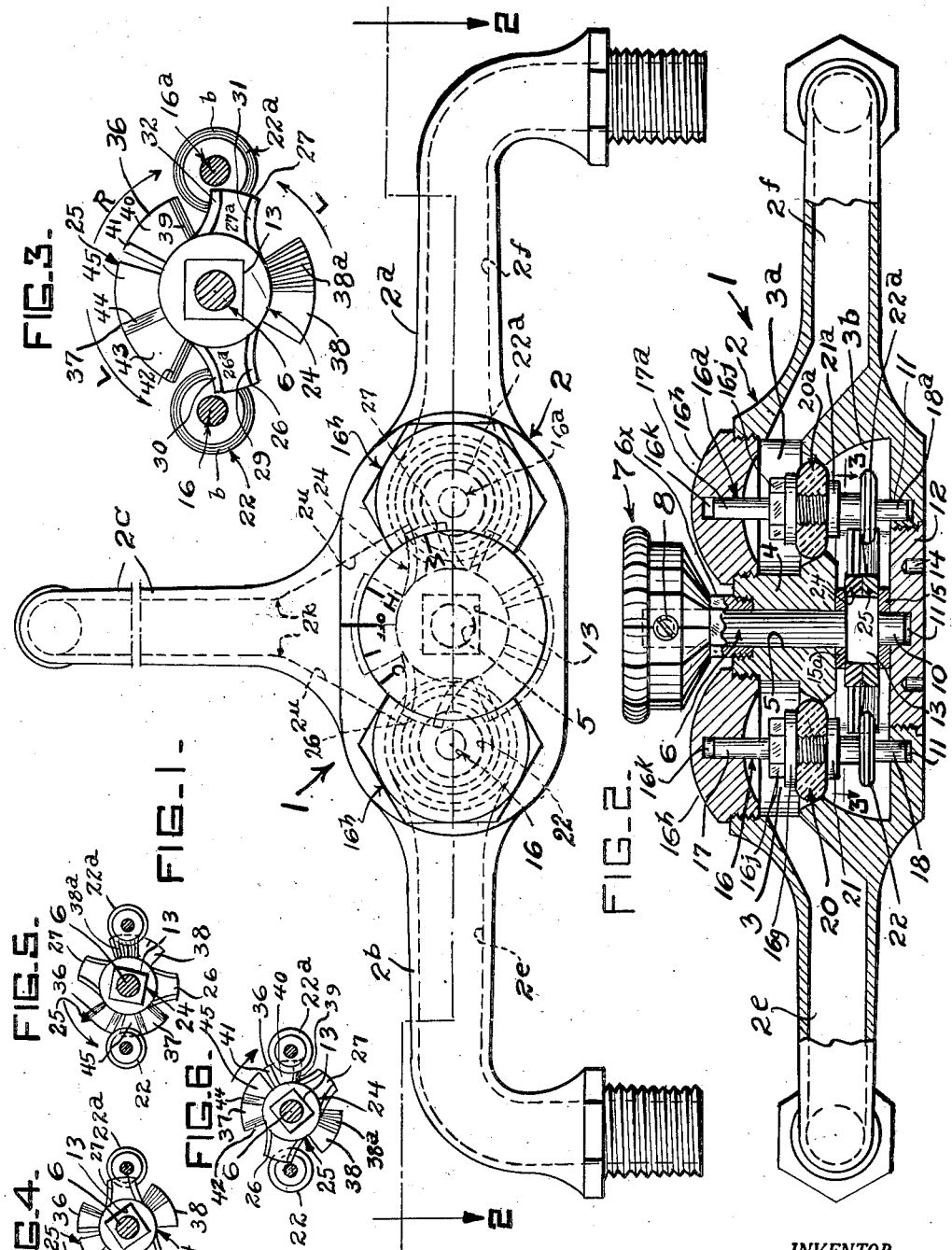
INVENTOR.
FREDERICK TOOP
BY
Elbert R. Bronner
his ATTORNEY Jan. 15, 1952     F. TOOP     2,582,804
DUAL VALVE SELECTIVE CONTROL HANDLE
ASSEMBLY FOR COMBINATION FAUCETS
Filed May 9, 1947     2 SHEETS—SHEET 2
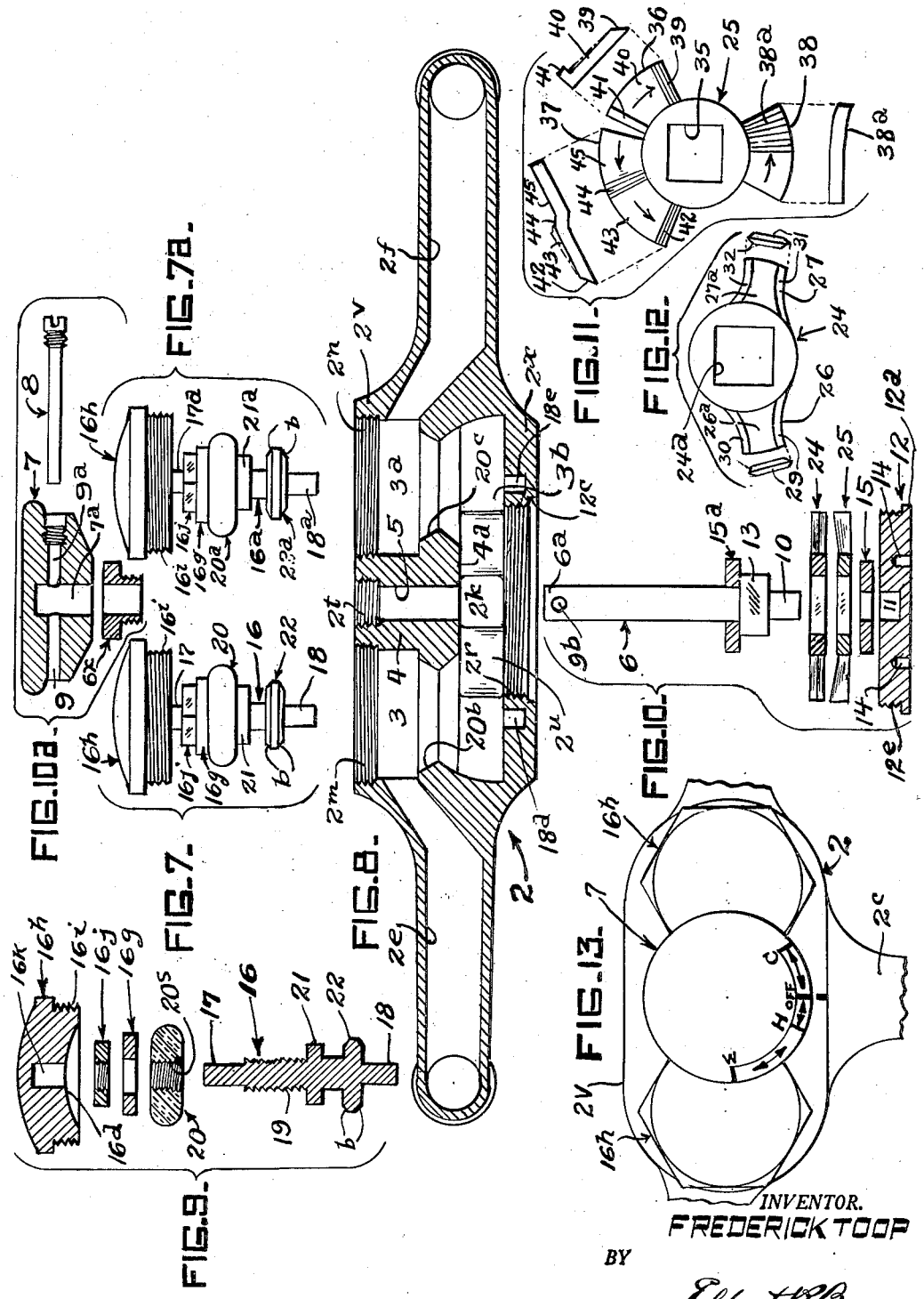
INVENTOR.
FREDERICK TOOP
BY
Elbert H. Bronner
his ATTORNEY.

Patented Jan. 15, 1952

2,582,804

UNITED STATES PATENT OFFICE 2,582,804

DUAL VALVE SELECTIVE CONTROL HANDLE ASSEMBLY FOR COMBINATION FAUCETS

Frederick Toop, New York, N. Y., assignor of twenty-five per cent to Dorothy Toop, New York, N. Y., twenty-five per cent to Anthony Freitas, and twenty-five per cent to Rose Freitas, both of New York, N. Y.

Application May 9, 1947, Serial No. 746,950

11 Claims. (Cl. 277—20)

My invention relates to a dual valve selective control handle assembly for combination faucets.

The salient object of my invention is the single handle assembly that will selectively operate two valves by an intermediate handle shaft unit, which may operate each valve independently of the other, for a full flow of either hot or cold liquid, or operate both valves in a partial or full open position to mix both hot and cold liquid for a warm liquid, all accomplished by valve operating members secured on the handle shaft unit contacting a circular flanges section on each of the valve stem or shaft thereof, whereby hot and cold liquid may be obtained in the required volume and proportion desired, and to the degree of temperature desired.

Another object of my invention is the valves' handle assembly constructed so that a right turn will operate one valve, and a left turn will operate the other valve, at the same time the valve not in use will remain in a closed and locked position, if both valves are required to operate at the same time, then, the valve's locking member on the handleshaft assembly is automatically positioned by a turn of the handle, so that free operation of both valves are permitted at the same time, and the volume of liquid flow from either or both valves is controlled to the desired degree by means of one single handle wheel or lever. Indicia markings therewith may be provided on the handle wheel or lever for the operation required, if so desired.

A further object of my invention is the dual valve body having two valve chambers, closely positioned to each other and divided by a wall portion that has a perpendicular bored hole there through in which a rounded handle shaft section is contained in a rotatable position. The upper end of the handle shaft is fitted with the handle wheel or lever to operate the handle shaft, and the lower end has a rounded section that is rotatably located in a bored hole in the bottom body nut that is provided for the handle location and handle assembly convenience. A squared section is provided on the lower end of the handle shaft, this squared section is positioned rotatably between the lower end of the faucet's dividing wall portion and the lower body nut.

Still a further object of my invention is the provision of means to take care of any wear, or compression of the valve members that may take place beyond the point of efficiency, by using a valve of semi-spherical shape, this type of valve may be reversed on the valve stem, and by so doing, will restore the valve to its original position on the permanent beveled valve seat.

Still another further object of my invention is the provision of means to operate the valves cam by locating both the valves' cam lifting and locking members slidably fixed on the square section of the handle shaft, the locking member which contacts the top portion of beveled flanges on each valve stem may be reversed and restored to its original efficiency, when desired.

Other objects of my invention will appear as the description proceeds in the following specification, accompanied by the annexed drawings, in which.

Figure 1 is a top plan view of my dual valve operated faucet combination and selective control handle.

Figure 2 is a longitudinal sectional view taken on line 2—2 of Figure 1.

Figure 3 is a transverse plan view of valve's cam mechanism, taken on line 3—3 of Figure 2, showing the cam member and handle shaft and valve locking member controlling opening and closing each valve.

Figure 4 is a diagrammatic plan view on a reduced scale, showing the same cam and valve locking mechanism in operation, one of the cam sections opening the valve for the hot liquid.

Figure 5 is a further similar view showing two cam sections opening both the hot and cold liquid valves, fully or partially, such as may be desired for a mild hot or warm liquid.

Figure 6 is a similar view showing one of the cam sections opening the valve for the cold liquid.

Figures 7 and 7a are elevational and sectional views of the left and right duplicate valve stem units or assembly.

Figure 8 is a longitudinal sectional view of the faucet's body member, with all parts omitted for the convenience of illustration.

Figure 9 is an exploded sectional view of either of the valve stem units, or assembly.

Figure 10 is an exploded view of the handle shaft and its lower valve operating members secured thereto.

Figure 10a is an exploded sectional view of the upper handle and handle-body nut and locking bolt therewith for securing handle firmly to hole in upper rounded portion of handle shaft.

Figure 11 is a plan view of the valve selective control cam member showing projected end or edge sections of each cam section.

Figure 12 is a plan view of the valve locking members with opposite cam-like extensions.

Figure 13 is a fragmentary view of the handle wheel and valve body nuts showing indicias thereon.

Referring to the drawings, the numeral 1 designates my complete dual valve operated faucet combination and selective control handle therewith, comprising a dual valve body member 2 having two valve chambers 3 and 3a closely positioned to each other and divided by a wall portion 4 having a perpendicular bored hole 5 therethrough for a handle shaft member 6 to rotate therein. The upper end of 6a of the handle shaft 6 is fitted into a bore 7a of a handle wheel 7 (or may be a lever, knob, etc.,) if so desired, which operates the shaft 6 by means of a bolt-screw 8 secured in hole 9 and 9a of handle wheel 7, the bolt-screw extending through hole 9b in the upper end 6a of handle shaft. The handle wheel 7 has an upper body handle nut 6x that is screwed into threaded portion 2t of the upper wall portion 4.

The lower rounded end 10 of handle shaft 6 is rotatably located in a bored hole 11 in the lower body nut 12 having a flange portion 12a that is secured into a counterbore 12c of the lower boss portion 2x of faucet's body member 2, all of which is for the handle location and convenience thereof. A squared section 13 is immediately provided above the lower end 10 of handle shaft 6, the squared section being positioned rotatably between the washer 15a bearing against the lower portion 4a of the faucet's dividing wall section 4, and washer bearing on lower body nut 12. Holes 14 are for operating a spanner wrench to remove and secure the lower body nut 12 having threaded portion 12e that screws into a threaded portion 2r of lower boss section 2x of body member 2.

Washers 15 and 15a are for positioning valve actuating locking and cam members 24 and 25 located and fixed on the squared section 13 of the handle shaft 6, in which left and right valve stems 16 and 16a are slidably inserted in each of the bores 16k of the upper valve body's nuts 16h and within the valve chambers 3 and 3a, these valve stems having upper rounded ends 17 and 17a, and lower rounded ends 18 and 18a, all slidable in bored holes 16d and 18e, respectively. The valve stems have threaded portions 19 on which the threaded holes 20s of each valve 20 and 20a are screwed down until abutting the ledges or flanges 21 and 21a. Adjacently below and suitably spaced apart are lower circular beveled edges flanges 22 and 22a on each valve stem 16 and 16a, providing means by which the valves 20 and 20a, made of yielding and resilient material, may be operated through the selective positioning of the valve by operating members 24 and 25 secured on the squared portion 13 of shaft 6. The lower flange 22 having beveled edges b around the circumference of the flange, allows the valve operating members 24 and 25 to gradually engage the flanges 22 and 22a, which operate in a rectilinear motion either in opening or closing of the valves 20 and 20a on their respective beveled seats 20b and 20c.

The valve stem body nuts 16h has a male threaded portion 16i that screws into female threaded portions 2m and 2n in the upper central boss portion 2v of the faucet's body 2, a washer 16g and a lock-nut 16j securing firmly each resilient valve on ledges 21 and 21a of valve stems which precisely position valve 20 and 20a onto their seats 20b and 20c, these valves having internal threaded portion 20s that screw onto threaded portion 19 of each stem 16 and 16a. Each of the valves' stem body nuts 16h have a recess portion 16d to provide suitable clearance above valves' lock-nuts 16j.

The two operating valve locking and cam members 24 and 25 located on squared section 13 of the shaft 6, are positioned between the two washers 15 and 15a. The top operating member 24, which is reversible, is for closing the valves and is provided with a square hole 24a into which the squared section 13 is located, this member 24 has two extended sections 26 and 27 extending in opposite directions from the square hole 24a of the handle shaft 6, to the working points of contact with the top of the lower flange 22 and 22a on each of the valve stem 16 and 16a. These extensions 26 and 27 are provided with beveled edge portions 29, 30, 31 and 32, that permits engagement with either of the valve flanges 22 and 22a on the valve stem 16 and 16a, for opening and closing the valves. The surfaces 26a and 27a retain firmly the valves down to a closed and locked position.

These valve locking arm-like extensions 26 and 27 are formed in a parallel line that is placed off center in a forward direction from the center of the hole in the valve closing members, this forward location of the valve closing members permit quick release of the valve opening purposes due to the very short movement required to clear the valve stem flange disks 22 and 22a, and at the same time retains the other valve in a closed position, as the short backward movement of the opposite extension portion is too short to permit release of that respective valve.

The valve opening cam member 25 is provided with a square hole 35 into which the squared section 13 of the handle shaft 6 is located, this valve lifting member 25 is provided with three extended individual fan-like segmental cam sections 36, 37 and 38, note Figures 3, 4, 5 and 6, each of these cam sections have varying plane levels, such as section 36 for right hand valve operation, has an entering or engaging beveled rise section 39 that partly opens its engaging valve 20a, it is also provided with a higher level plane 40, which, when brought into position under the engaging stem flange disk 22a provides a full flow of cold liquid, this section 36 is also provided further with a ridge-like stop portion 41, which controls the turning motion by contact with the valve stem flange 22a. Note Figure 6.

Section 37 for the left hand valve operation, see Figure 4, has an entering or engaging beveled portion 42 that partly opens the valve 20, it is also provided with a higher level plane 43 which, when brought into position under the stem flange disc 22, provides a full flow of hot liquid, this member 42 is also provided with a descending portion 44 terminating into a semi-lower plane or section 45, which, when in position under the left valve stem flange 22, reduces the flow of hot liquid from the valve 20, and at the same time brings into operation the extending portion 38 which is only for the right hand valve operation and has an entering or engaging lower plane section 38a which, when brought into position under the right hand valve stem flange disc 22a will raise the valve 20a to permit a desired flow of cold liquid, and at the same time permit the desired flow of hot liquid from the valve 20, this in turn positions the lower level 45 of cam section 37 under the left hand valve stem flange disc 22 and reduces the flow of hot liquid from the valve 20 to the low point for mild or warm liquid, which is limited by the stop 41 on section 36 contacting the flange disc 22 on the left hand valve stem 16. Note Figure 5.

Thus a dual valve selective control handle assembly is provided, that operates two valves singular or together, giving a controlled flow of liquid in a selective and controlled manner from either valve singular, or from both valves, and in volume desired from each valve assembly.

It is understood that I may adopt other means to obtain the same functioning of lifting and closing valves 20 and 20a, however, it is believed that the locking member 24 and opposite extensions 26 and 27 will prove serviceable, and should wear be apparent, said member may be reversed, so the unengaged side of extensions may operate on original plane as worn sides, as it is obvious that each valve must be compressed firmly under pressure to make it sealtight on valve seats. Also the cam sections 36, 37 may have their plane levels 40 and 43 slightly beveled to keep firm contact when engaging flanges 22 or 22a, and provide for wear thereat.

The dual valve body member 2 has opposite left and right inlet sections 2a and 2b provided with inner passages 2e and 2f connecting to chambers 3 and 3a. A front spout section 2c leads from a lower valve chamber 3b, and has a converging passage 2u leading to a reduced opening 2k and the spout 2c, in which the resilient valves 20 and 20a control the flow of liquid therebetween. Opposite sections 2a and 2b lead to hot and cold liquid supply, such as for example, hot and cold water, or for any kind of liquids to be mixed either in varying temperatures or in volume, as the same principles of my faucet as hereinbefore described, may be adapted for any type of dispensing devices.

The handle assembly is unattached to the valve stem assemblies, the valve stem assemblies or units are completely unattached to the handle shaft assemby or unit, the valves on the valve stems being operated by contact and engagement of fixed members or portions of each valve stem and handle shaft assemblies.

It is understood that I do not wish to confine myself to the exactness of any part in the drawing, and the description thereof, and reserve the right to amend and alter same providing it comes within the scope of the appended claims.

Having thus described my invention what I claim as new and desire to secure by Letters Patent of the United States of America, is as follows:

1. A dual valve selective control for combination faucets of the character described comprising two valves operative within separate chambers in faucet's body member, each having a permanent beveled valve seat therein, liquid inlet sections and a spout outlet section, a threaded section for a lower body nut, a partition wall dividing the valve chambers through which the handle shaft is located and rotated, said lower body nut positioned directly under the end of the handle shaft with a bored hole for shaft's location, each of the valve chambers having a valve stem body nut with a bored hole therein in which the upper end of each valve stem are located, the lower end of each valve stem being in a bored hole in the lower body's central boss section, in which valve stems are slidingly actuated in a rectilinear motion for raising and lowering said valves in their open and closed positions, respectively, thus assuring perfect control of each valve on their respective beveled seats.

2. A dual valve selective control for combination faucets of the character described, two valve assemblies and an intermediate handle shaft assembly, two valve chambers closely positioned to each other and divided by a wall portion that has a perpendicular bore therethrough in which the rounded handle shaft section is contained in a rotatable position, the lower end of said handle shaft having its rounded section rotatably located in a bored hole of the faucet's bottom body nut, a square section provided on the lower end of said handle shaft, said square section positioned rotatably between the lower end of the faucet's dividing wall and lower body nut, said square section securing a cam member and valves locking member thereon, said cam member having three different circumferential cam sections, one cam section when said handle and handle shaft is turned at about 20 degrees, opens one of said valves for cold liquid, another cam section when turned at also about 20 degrees in the opposite direction to aforesaid cam section opens the valve for hot liquid, the valves locking member having opposite extending sections keep that particular valve when not in use, in a locked position, by means of lower circular flange portions on the lower valve stems engaging either of the extended sections of said locking member, the second instance cam member when opening hot liquid valve, adapted to continue its movement further to another semi-lower level therewith which keeps said hot liquid valve open, at the same time another further or third cam section engages the circular flange on the other valve stem and opens said cold water valve for a required flow and volume to provide warm liquid, said valve stems operating in a reciprocating rectilinear motion within their upper and lower bore bearings, said valve being reversible, as is also the valves locking member due to wear thereof, said valves locking member having their opposite extended portions formed in a parallel line that is placed off center in a forward direction from the center of the handle shaft, this forward location permitting quick action or release of each valve opening operation, this forward location of the valve closing members permits quick release of the valves for opening purposes, due to the very short forward movement required for either of the extensions the locking member to clear the beveled valve stem flange, at the same time the short backward movement of the opposite extension of the locking member is too short to permit release of the closed valve.

3. A dual valve selective control for combination faucets of the character described, a faucet body provided with opposite inlet sections, and a central boss portion having two valve chambers into which are inserted valve stem assemblies through openings in an upper portion of said central boss portion, said valve chambers closely positioned to each other by an intermediate wall portion through which extends a handle shaft of a handle shaft assembly having a lower square portion onto which the valves are secured a locking member provided with opposite extensions that engage circular flange portions on the lower end of each valve stem, adjacent to said locking member being a cam member having separate cam sections, said handle shaft provided with a handle member that requires only a slight turn (about one-twentieth) to move the required cam section to engage the circular flange of the valve stem of the valve for cold liquid to open said valve, a similar slight turn in the opposite direction moves another cam section in engagement with the other circular flange on another valve stem to open the hot liquid valve, at the same time said opposite extensions of the valves locking member keeps the valve not in use closed when the other valve is open, said cam opening hot liquid valve is adapted to move further to a required level to keep the hot liquid valve open while another third cam section moves into engagement in the same direction of said aforesaid cam, to open the cold liquid valve, thereby mixing said liquids to a required flow of both hot and cold liquid, stop means provided therewith to control and limit the movement of the cam sections for cold liquid and for warm liquid, as only one-third rotation of the handle wheel is necessary to obtain the above operations.

4. A dual valve selective control for combination faucets of the character described, and as defined in claim 3, markings provided on the handle member to register with the "Off" mark fixed on the boss portion of the faucet's body, said markings being for cold, hot and warm liquid operations.

5. A combination faucet device of the character described, comprising a dual valve body member with left and right liquid inlet sections, and an outlet spout section, embodying a selective control handle shaft unit operating semi-circular valves of left and right valve stem units, singularly or both together, thereby controlling the flow of liquid therethrough by means of a cam member and a valve locking member secured on the lower end portion of said handle shaft unit, said cam member having varying rises and plane levels for the right hand valve operation, said cam member having an entering and engaging first beveled rise section contacting a flange disk member on the lower end of said right valve stem unit, thereby opening said valve partly for a flow of cold water, said first beveled rise terminating into a higher plane level, which opens said valve fully, thereby allowing a full flow of cold liquid, said higher plane level terminating into a ridge-like stop portion, thereby controlling and limiting said flow of said cold liquid, for said left hand valve operation, said cam member has an entering and engaging rise section contacting its respective flange disk member on the lower end of said left valve stem unit, thereby opening said valve partly for a flow of hot liquid, said rise terminating into a higher plane level, thereby allowing a full flow of hot liquid, said higher level descending to a lower level, whereat, said cam may control a reduced flow of hot water, said cam member having a further section having a continuous rise portion and a descending portion, which contacts said flange disk member of the left hand valve stem unit, and simultaneously the other disk member of the right hand valve stem unit engages first beveled rise portion of the first instant cam section, thereby providing a partial flow of hot water and cold water mixed together, said mixture being controlled to the amount of flow of each liquid, the ridge-like stop portion of the first instant cam section controlling the flow of cold liquid, whereby the hot liquid may be regulated as desired, said locking member for said valves having opposite extended arm-like portions provided with upper and lower beveled edges that engage said flange disk members to keep closed one of said valves, when the other is being opened, and to keep both valves closed, fully or partially, or allow both to open for a mixture of cold and hot liquids by said left and right valve stem units to the degree of temperature desired, said cam member and valve locking member slidably secured on a square portion on the lower end of said handle wheel shaft unit, thereby both actuating together, said locking member adapted to be reversed, if so desired, for the unused bevel edges, to bring back said locking member to its original position.

6. A selective control means for combination faucets of the character described comprising a main body having separate inlet chambers adapted to be connected to different sources of liquid supply and a valve seat in each inlet chamber, a handle shaft journaled in said body, a cam member fixed to said shaft for rotation therewith, said cam member having varying rises and plane levels, a valve locking member, means for causing simultaneous actuation of said locking member by said cam member when said shaft is rotated, a pair of valve stem units disposed on opposite sides of said shaft, said valve stem units being axially movably supported in said inlet chambers, each of said valve stem units comprising a valve normally resting under pressure on its valve seat in the inlet chamber, flange disc members on each valve stem unit for movement therewith, a lower chamber in said main body communicating with said inlet chambers, said flange disc members and said valve locking member being disposed within said lower chamber, said valve locking member being in operative contact with said flange disc members whereby selective directional rotation of said shaft will cause simultaneous actuation of said valves with respect to their seats, a single spout communicating with said lower chamber, a first opening in said body communicating with said lower chamber, second and third openings in said body communicating with said inlet chambers, removable plug members in said first, second and third openings to provide ready access to said valve stem units, said shaft, said cam, and said locking member for removal, repair and replacement.

7. A dual valve selective control for combination faucets of the character described comprising a valve body member having a medial wall portion and a central spout outlet, upper valve chambers formed in said dual valve member disposed on opposite sides of said medial wall, each upper valve chamber communicating with a source of liquid supply, lower valve chambers formed in said dual valve member disposed on opposite sides of said medial wall, corresponding upper and lower valve chambers being in communication with each other, a valve seat formed in said dual valve member and disposed between each pair of corresponding upper and lower valve chambers, a handle shaft journaled in said medial wall, a valve stem unit mounted in each upper chamber, each valve stem unit comprising an axially adjustably movable valve member having a rounded edge and normally resting on said valve seat to thereby block communication between said corresponding upper and lower valve chambers, said lower valve chambers communicating with said spout outlet, a flange disk member secured to each valve stem unit and disposed within said lower valve chamber, a segmental cam member secured to said handle shaft for rotation therewith, said cam member being disposed within said lower valve chambers, said cam member being adapted to frictionally selectively engage said flange disk members, whereby when said handle shaft is rotated it will cause said cam member to rotate and thereby selectively engage said flange disk members to axially move said valve stem unit to raise a selected valve member from its seat and permit the flow of water from the source of supply to the upper valve chamber thence to the lower valve chamber and out through said central spout outlet.

8. A dual valve selective control for combination faucets of the character described, a dual valve body member having left and right valve chambers with valve seat portions and with inlet liquid sections, and a central spout section, left and right valve stem units, secured in said body member by an upper body nut, an intermediate handle shaft arranged between said valve stem units, said valve stem units comprising valve members having semi-circular edges normally contacting said seat portions of said left and right valve chambers into which said valve stem units are arranged, a flange disk member arranged on the lower ends of each valve stem units within a lower valve chamber, a cam member having varying rises and level sections secured on the lower end of said handle shaft, for rotation therewith, a locking member for said valves positioned above said cam member, means for mounting said locking member on said shaft for rotation with said cam, said flange disk members of said valve stem units being in operative frictional contact with said locking member whereby selective rotation of said handle shaft will cause selective raising or lowering of said valve stem units, whereby to cause closing and opening of said valves, said valve stem units being detachably secured to said dual valve body member, said flange disk members, cam and locking members being disposed within a lower valve chamber of said body member, said lower valve chamber connecting to a single central spout outlet, through which liquid may flow in any desired manner.

9. A dual valve selective control for combination faucets of the character described as defined in claim 8 in which openings are provided in said valve body member, said openings communicating directly with said left and right valve chambers and being in substantial axial alignment with said valve stem units, a removable plug member closing off each opening whereby upon removal of said plug members said valve stem units may be removed through said openings for repair or replacement.

10. In a dual selective valve control mechanism for combination faucets of the character described, a dual valve body member provided with left and right movable valve stem units comprising valves normally resting on their respective seats, a central handle shaft unit arranged between said valve stem units, said handle shaft unit comprising a circular fan-like segmental cam member secured on the lower end thereof for movement therewith and a valve control and locking member abutting said cam member and comprising two arm-like extensions, said cam member and said two arm locking members being rotatable as a unit, flange disks arranged on the lower end of each valve stem unit, said flange disks being normally frictionally held in between the arm-like extensions of said valve control and locking member whereby rotation of said shaft unit will cause the segmental cam member to act upon said flange discs to actuate said valves.

11. In a dual selective valve control mechanism for combination faucets of the character described, and as defined in claim 10, said arm-like extensions of said valve control and locking member are located off center of said cam member in a forward direction therefrom, said forward location of said extensions permit quick release of the valve opening due to the short movement required to clear the flange disks on said valve stem units, and at the same time retains the other valve in a closed position on the short backward movement of the opposite or other extension being too short to permit release of that respective valve.

FREDERICK TOOP.

REFERENCES CITED

The following references are of record in the file of this patent:

UNITED STATES PATENTS

| Number | Name | Date |
|---|---|---|
| 248,971 | Whittaker | Nov. 1, 1881 |
| 1,542,571 | Mueller | June 16, 1925 |
| 1,840,961 | Kuenzler | Jan. 12, 1932 |
| 1,895,478 | McCune | Jan. 31, 1933 |
| 2,033,941 | Kryzanowsky | Mar. 17, 1936 |
| 2,417,158 | Fraser | Mar. 11, 1947 |